(12) United States Patent
Bark et al.

(10) Patent No.: US 10,663,212 B2
(45) Date of Patent: May 26, 2020

(54) CHILLING SYSTEM USING WASTE HEAT RECOVERY BY CHILLER DISCHARGE GAS

(71) Applicant: SINJINENC, Jeonju-si (KR)

(72) Inventors: Jin Sup Bark, Muju-gun (KR); Sang Myun Park, Jeonju-si (KR)

(*) Notice: Subject to any disclaimer, the term of this patent is extended or adjusted under 35 U.S.C. 154(b) by 161 days.

(21) Appl. No.: 15/807,615

(22) Filed: Nov. 9, 2017

(65) Prior Publication Data

US 2019/0072312 A1 Mar. 7, 2019

(30) Foreign Application Priority Data

Sep. 4, 2017 (KR) .................. 10-2017-0112842

(51) Int. Cl.
*F25D 21/12* (2006.01)
*F25B 6/00* (2006.01)
*F25B 41/04* (2006.01)
*F25B 5/02* (2006.01)

(52) U.S. Cl.
CPC ............... *F25D 21/12* (2013.01); *F25B 5/02* (2013.01); *F25B 6/00* (2013.01); *F25B 41/04* (2013.01); *F25B 2339/047* (2013.01); *F25B 2400/01* (2013.01); *F25B 2400/0403* (2013.01); *F25B 2400/23* (2013.01); *F25B 2400/24* (2013.01); *F25B 2600/25* (2013.01); *F25B 2600/2507* (2013.01); *F25B 2700/2104* (2013.01)

(58) Field of Classification Search
CPC ............. F25D 21/12; F25D 2500/0403; F24F 5/0096; F24F 2221/183; F24F 2005/0025; F28D 20/0034; F28D 2020/0065; F28D 2020/0069; F25B 6/02; F25B 2400/0403; F25B 2400/23; F25B 2400/24; F24H 4/02; F24H 4/04; F24H 17/0005; F24H 17/001; F24H 17/0052; F24H 17/0057; F24D 17/02

See application file for complete search history.

(56) References Cited

U.S. PATENT DOCUMENTS

| 4,592,206 | A | * | 6/1986 | Yamazaki | ............... | F24D 15/04 |
| | | | | | | 62/160 |
| 4,693,089 | A | * | 9/1987 | Bourne | ..................... | F24D 3/08 |
| | | | | | | 62/79 |
| 4,955,207 | A | * | 9/1990 | Mink | ..................... | F24D 17/02 |
| | | | | | | 62/238.6 |
| 2018/0313587 | A1 | * | 11/2018 | Du | ........................... | F25B 6/04 |

FOREIGN PATENT DOCUMENTS

EP         2306111 A1 *  4/2011  .......... F24D 11/0214

* cited by examiner

*Primary Examiner* — Jonathan Bradford
(74) *Attorney, Agent, or Firm* — Antonio Ha & U.S. Patent, LLC

(57) ABSTRACT

A refrigeration system includes a compressor configured to compress a refrigerant, a condenser configured to condense the compressed refrigerant introduced from the compressor, a main flow passage configured to deliver the refrigerant compressed in the compressor to the condenser, a heat storage tank configured to partially store the heat of the refrigerant discharged from the compressor, an auxiliary flow passage configured to deliver the refrigerant compressed in the compressor to the heat storage tank, an expansion valve configured to expand the refrigerant condensed in the condenser, and an evaporation-side composite heat exchanger configured to evaporate the expanded refrigerant.

10 Claims, 4 Drawing Sheets

CHILLING SYSTEM USING WASTE HEAT RECOVERY BY CHILLER DISCHARGE GAS

CROSS-REFERENCE TO RELATED APPLICATION

This application claims priority to Korean Patent Application No. 2017-0112842, filed on Sep. 4, 2017, and all the benefits accruing therefrom under 35 U.S.C. § 119, the contents of which are herein incorporated by reference in their entireties.

BACKGROUND OF THE INVENTION

1. Field of the Invention

Exemplary embodiments of the present invention relate to a refrigeration system using condensation waste heat recovery by refrigerator discharge gas. More particularly, exemplary embodiments of the present invention relate to a refrigeration system capable of recovering condensation waste heat for defrosting without using additional power.

2. Description of the Related Art

Generally, the refrigeration system has a structure in which an evaporator is installed, and a compressor, a condenser, and an expansion valve are installed. During the cooling cycle of the compressor, the condenser, the expansion valve, and the evaporator, cold air is generated by heat exchange between the evaporation heat of the evaporator and the outside air temperature. At this time, frost is formed on the surface of the evaporator due to the difference between the heat of evaporation and the temperature of the outside air. As described above, the frosting on the surface of the evaporator gradually increases and hinders the heat exchange effect of the evaporator and increases the power consumption of showcases.

Accordingly, when the amount of frost is excessively increased, a defrost mode operation for removing the frost is essential. In a conventional showcase, a defrosting method is constituted such that a defrost heater is installed in the periphery and the heater is operated at a preset time to melt and remove the frost on the evaporator.

As described above, the defrosting method using the defrosting heater has an advantage that defrosting is performed in a short time by providing high-temperature heat to the evaporator, but there is a problem of using an external heat source or energy.

Also, in a general refrigeration cycle, when a system for recovering condensation waste heat is used, there is an advantage that an external heat source or energy can be saved. However, this system also has the disadvantage of using a separate external energy at the time of recovering the condensation waste heat.

The present invention has been made to solve the above-mentioned problems, and it is an object of the present invention to provide a refrigeration system using condensation waste heat recovery by a refrigerator discharge gas. And according to the present invention, it is possible to store energy that can be used for defrosting in a refrigeration cycle without using any external energy.

BRIEF SUMMARY OF THE INVENTION

Exemplary embodiments of the present invention provide a refrigeration system using condensed waste heat recovery by refrigerator discharge gas.

In an exemplary embodiment of a refrigeration system using condensed waste heat recovery by refrigerator discharge gas according to the present invention, the system comprises a compressor configured to compress refrigent; a condenser configured to condense compressed refrigent introduced from the compressor; a main flow passage configured to deliver the refrigerant compressed in the compressor to the condenser; a heat storage tank configured to partially store the heat of the refrigerant discharged from the compressor; an auxiliary flow passage configured to deliver the refrigerant compressed in the compressor to the heat storage tank; an expansion valve configured to expand the refrigerant condensed in the condenser; and an evaporative-side composite heat exchanger configured to evaporate the expanded refrigerant, wherein the evaporative-side composite heat exchanger comprises an evaporation pipe through which the refrigerant expanded in the expansion valve passes and a defrost water supply pipe through which the circulating water in the heat storage tank passes.

In the exemplary embodiment, the auxiliary flow passage may comprise a heat exchange path passing through the interior of the heat storage tank; a gas-liquid separation unit located at a distal end of the heat exchange path and separating the vaporized refrigerant and the liquefied refrigerant; a condensation return path for returning the refrigerant vaporized in the gas-liquid separation unit to the main flow passage; and an expansion return path for returning the refrigerant liquefied in the gas-liquid separation unit to the expansion valve.

In the exemplary embodiment, the gas-liquid separation unit may be formed of a cylinder-shaped gas-liquid separation header, and the expansion return path comprising a check valve and connected to the lower part of the gas-liquid separation header returns the liquefied refrigerant to the expansion valve by gravity.

In the exemplary embodiment, the heat exchange path of the auxiliary flow passage may have several gradual bendings in the heat storage tank.

In the exemplary embodiment, the system may further comprise an auxiliary heater disposed in the heat storage tank and capable of being heated by an external power source.

In the exemplary embodiment, the system may further comprise a main flow path control valve located between the compressor and the condenser and controlling the main flow path; and an auxiliary flow path control valve located at the inlet of the heat exchange path of the auxiliary flow passage, wherein the flow path of the refrigerant is controlled by the main flow path control valve and the auxiliary flow path control valve.

In the exemplary embodiment, the main flow path and the auxiliary flow passage may be controlled by a three-way valve.

In the exemplary embodiment, the evaporation-side composite heat exchanger may comprise a quenching chamber evaporator configured to provide quenching to the quenching chamber; a freezing chamber evaporator configured to provide freezing to the freezing chamber; a cooling chamber evaporator configured to provide cooling to the cooling chamber; a quenching chamber-side evaporation pressure regulating portion disposed between the quenching chamber evaporator and the expansion valve; a freezing chamber-side evaporation pressure regulating portion disposed between the freezing chamber evaporator and the expansion valve; a cooling chamber-side evaporation pressure regulating portion disposed between the cooling chamber evaporator and the expansion valve; an evaporation-side inflow piping system configured to supply the refrigerant to the evaporators; and an evaporation-side outflow piping system configured to deliver the refrigerant discharged from the evaporators.

In the exemplary embodiment, the quenching chamber-side evaporation pressure regulating portion may comprise a first quenching chamber inflow pressure regulator and a second quenching chamber inflow pressure regulator which are connected to the evaporation-side inflow piping system and formed at the inlet of the quenching chamber evaporator; and a first quenching chamber temperature sensor and a second quenching chamber temperature sensor which are located at the outlet of the quenching chamber evaporator and measure temperature of the outlet of the quenching chamber evaporator, wherein the first quenching chamber inflow pressure regulator is controlled by the first quenching chamber temperature sensor and the second quenching chamber inflow pressure regulator is controlled by the second quenching chamber temperature sensor.

In the exemplary embodiment, the freezing chamber-side evaporation pressure regulating portion comprises a freezing chamber inflow pressure regulator connected to the evaporation-side inflow piping system and formed at the inlet of the freezing chamber evaporator; a freezing chamber-side refrigerant re-inflow path connected to evaporation-side outflow piping system and delivering the refrigerant discharged from the quenching chamber evaporator to the freezing chamber-side evaporator; and a freezing chamber temperature sensor located on the outlet of the freezing chamber evaporator and measuring the outlet temperature of the freezing chamber evaporator, wherein the freezing chamber-side inflow pressure regulator is controlled by the freezing chamber temperature sensor, and the refrigerant from the evaporation-side inflow piping system and the refrigerant discharged from the freezing chamber-side refrigerant re-inflow path are mixed and introduced into the freezing chamber evaporator.

In the exemplary embodiment, the cooling chamber-side evaporation pressure regulating portion may comprise a cooling chamber inflow pressure regulator connected to the evaporation-side inflow piping system and formed at the inlet of the cooling chamber evaporator; a cooling chamber-side refrigerant re-inflow path connected to the evaporation-side outflow piping system and introducing the refrigerant discharged from the freezing chamber evaporator into the cooling chamber-side evaporator, and a cooling chamber temperature sensor located on the outlet of the cooling chamber evaporator and measuring the outlet temperature of the cooling chamber evaporator, wherein the cooling chamber-side inflow pressure regulator is controlled by the cooling chamber temperature sensor, and the refrigerant from the evaporation-side inflow piping system and the refrigerant discharged from the cooling chamber-side refrigerant re-inflow path are mixed and introduced into the cooling chamber evaporator.

According to the present invention configured as described above, it is possible to collect the thermal energy for defrosting without using any additional energy, and to perform defrosting efficiently without additional power consumption. And, in the refrigeration system using quenching-freezing-cooling together, the refrigerant can be efficiently used, and energy can be efficiently used.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
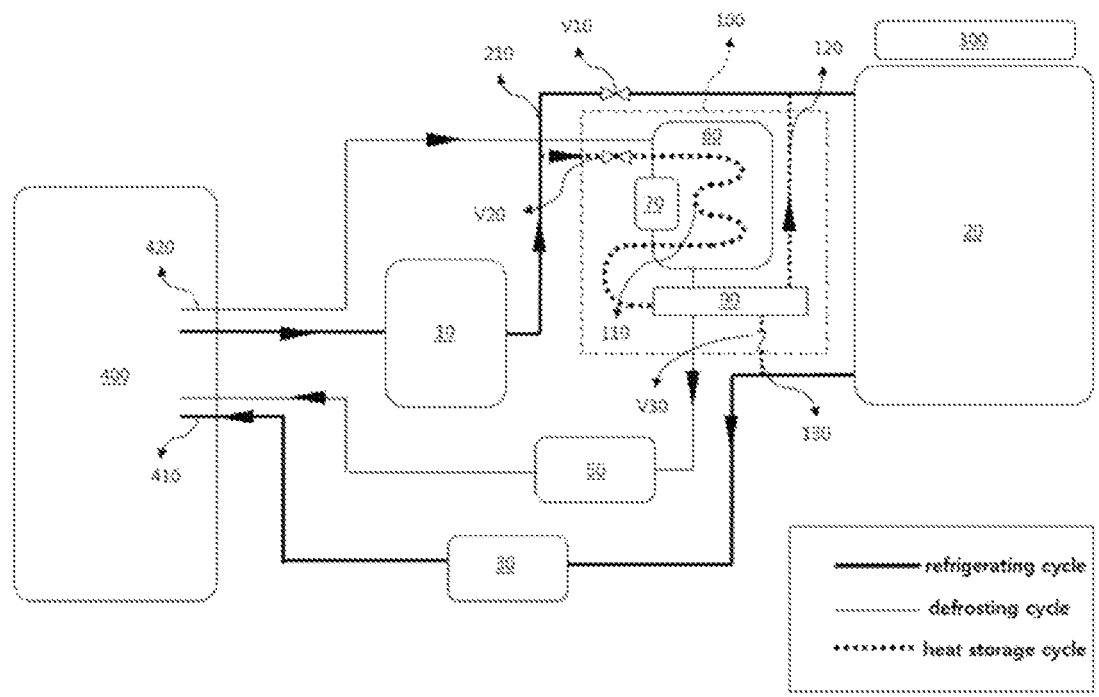
FIG. 1 is a drawing showing a configuration of a condensation waste heat recovery refrigeration system using refrigerator discharge gas according to an embodiment of the present invention.

The objects, features and advantages of the present invention described above will become more apparent from the following description of the embodiments with reference to the accompanying drawings.

The following specific structural or functional descriptions are merely illustrative for purposes of illustrating embodiments according to the concept of the present invention, and it is to be understood that the embodiments in accordance with the concepts of the present invention may be embodied in various forms, and it should not be construed as being limited to the examples described in the specification.

The embodiments according to the concept of the present invention can make various changes and have various forms, so that specific embodiments are illustrated in the drawings and described in detail in the present specification. However, it should be understood that it is not intended to limit the embodiments according to the concepts of the present invention to the particular forms disclosed, but includes all modifications, equivalents, and alternatives falling within the spirit and scope of the present invention.

Hereinafter, exemplary embodiments of the present invention will be described in further detail with reference to the accompanying drawings.

Overall Configuration of the System

FIG. 1 is a drawing showing a configuration of a condensation waste heat recovery refrigeration system using refrigerator discharge gas according to an embodiment of the present invention.

Referring to FIG. 1, a condensation waste heat recovery refrigeration system using refrigerator discharge gas according to an embodiment of the present invention includes a compressor (10) configured to compress refrigerant, a condenser (20) configured to condense the compressed refrigerant introduced from the compressor, a main flow passage (210) configured to deliver the refrigerant compressed in the compressor to the condenser, a heat storage tank (60) configured to partially store the heat of the refrigerant discharged from the compressor, an auxiliary flow passage (100) configured to deliver the refrigerant compressed in the compressor to the heat storage tank, an expansion valve (30) configured to expand the refrigerant condensed in the condenser, and an evaporative-side composite heat exchanger (400) configured to evaporate the expanded refrigerant.

The evaporation-side composite heat exchanger (400) includes an evaporation pipe (410) through which the refrigerant expanded in the expansion valve passes and a defrost water supply pipe (420) through which the circulating water in the heat storage tank (60) passes.

The auxiliary flow path system (100) includes a heat exchange path (110) passing through the interior of the heat storage tank (60) and a gas-liquid separation unit (90) located at a distal end of the heat exchange path (110) and separating the vaporized refrigerant and the liquefied refrigerant, a condensation return path (120) for returning the refrigerant vaporized in the gas-liquid separation unit (90) to the main flow path, an expansion return path (130) for returning the refrigerant liquefied in the gas-liquid separating unit (90) to the expansion valve (30).

The heat storage tank (60) may further include an auxiliary heater (70) that can be heated by an external power source. The condenser (20) may further include a defrost sensor (300) on one side of the condenser to detect a condition requiring defrosting of the evaporator.

And, the system may further comprise a main flow path control valve (V10) and an auxiliary flow path control valve (V20). The main flow path control valve (V10) is located between the compressor (10) and the condenser (20) and controls the main flow path (210). The auxiliary flow path control valve (V20) is located at the inlet of the heat exchange path (110) and controls the flow of the refrigerant into the auxiliary flow path system (100).

The main flow path control valve (V10) and the auxiliary flow path control valve (V20) may be integrated and installed by a single three-way valve (V50).

Normal Operation and Defrost Operation

Figure 2:
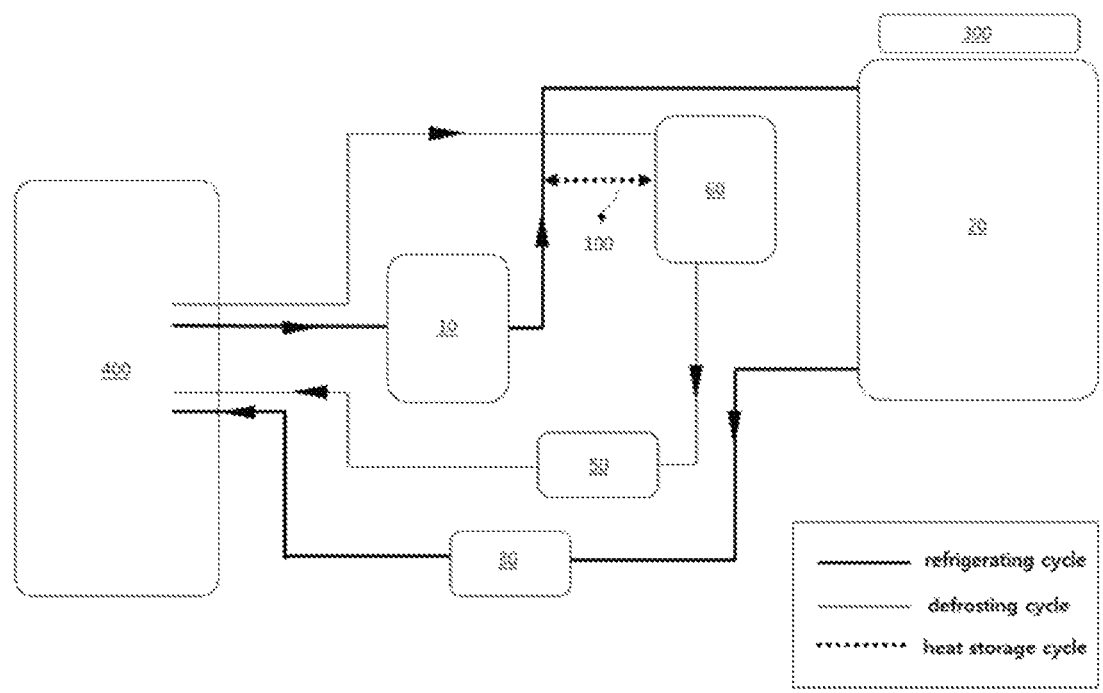
FIG. 2 is a diagram for explaining driving of the refrigeration system of FIG. 1.

FIG. 2 is a view for explaining driving of the refrigeration system of FIG. 1.

The driving of the refrigeration system using the condensation waste heat recovery by the refrigerator discharge gas according to the present embodiment will be described first.

During normal operation, the refrigerant compressed in the compressor (10) is delivered to the condenser (20) in the refrigeration system. In this process, the high-temperature refrigerant compressed by the compressor (10) transfers heat to the heat storage tank (60) through the auxiliary flow path system (100) to store energy. The refrigerant transferred to the condenser (20) is transferred to the expansion valve (30) again, and the cooled refrigerant is transferred to the evaporative-side composite heat exchanger (400) to cool the object. Through this cycle, the subject can be frozen and cooled.

If it is determined by the defrosting sensor (300) that the evaporative-side composite heat exchanger (400) needs defrosting, the defrosting operation proceeds. In the defrosting operation, heat stored in the heat storage tank (60) is transferred to the evaporative-side heat exchanger (400) through the circulating water to perform defrosting. At this time, the circulation of the circulating water is started by the operation of the separate defrost pump (50).

Therefore, heat is stored in the heat storage tank (60) during normal operation, defrosting operation is performed when defrosting is needed, and heat can be stored in the heat storage tank (60) without using a separate power source.

Thermal Storage System

Referring to FIG. 2 again, during normal operation, the high-temperature refrigerant compressed in the compressor (10) transfers heat to the heat storage tank (60) through the auxiliary flow path system (100) to store energy.

Referring to FIG. 1 again, the auxiliary flow path system (100) includes a heat exchange path (110) connected to the main flow path (210) and passing through the heat storage tank (60). The high-temperature refrigerant compressed by the compressor (10) stores energy in the heat storage tank (60) through the heat exchange path (110) of the auxiliary flow path system (100).

The heat storage tank (60) is controlled to store heat only up to a specified temperature. The heat storage tank (60) usually store energy limited to a temperature of 40 degrees by controlling the refrigerant flow of the auxiliary flow path system (100). Further, the refrigerant flow of the auxiliary flow path system (100) is controlled by the main flow path control valve (V10) and the auxiliary flow path control valve (V20) described above.

Figure 3:
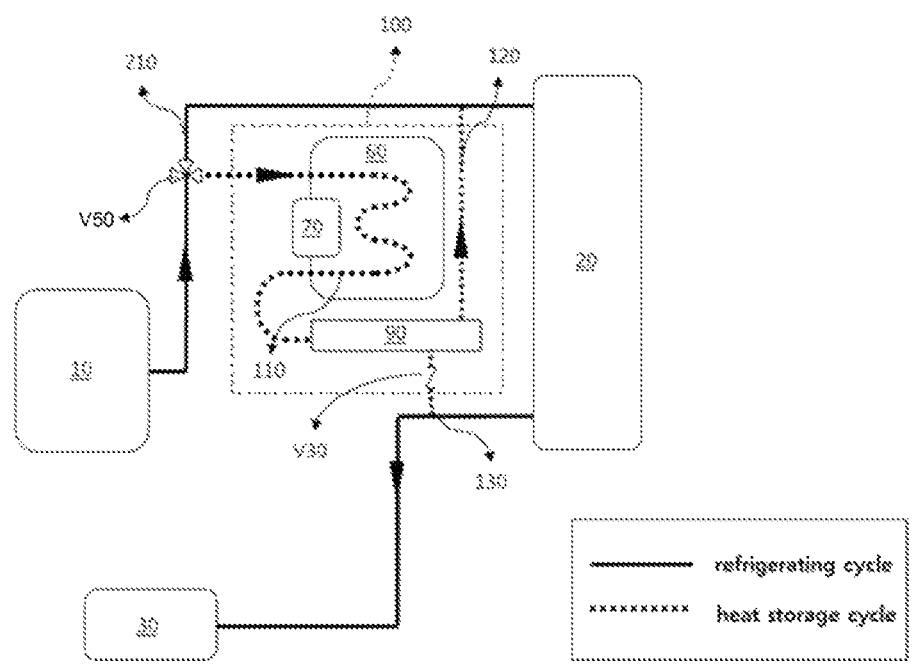
FIG. 3 is a drawing showing an auxiliary flow path system according to an embodiment of the present invention.
Figure 4:
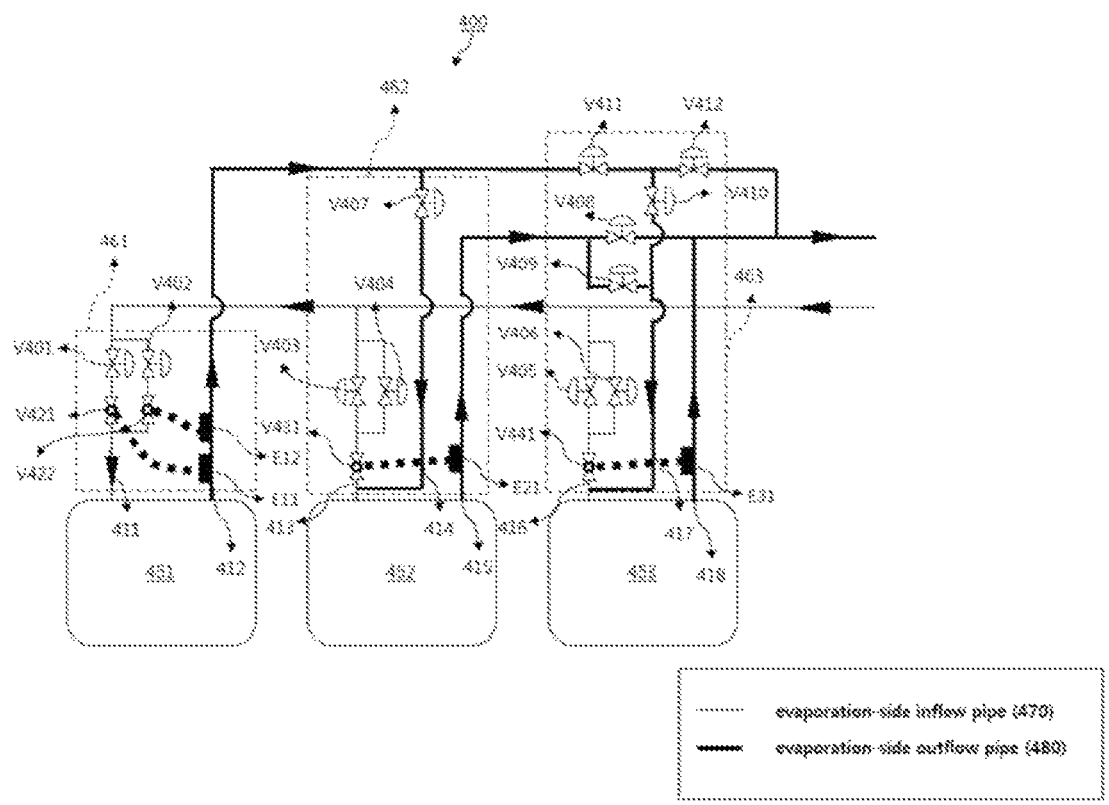
FIG. 4 is a view showing an evaporation-side composite heat exchanger according to an embodiment of the present invention.

Further, the main flow path control valve (V10) and the auxiliary flow path control valve (V20) can be controlled by a single valve by the three-way valve (V50), which is shown in FIG. 3.

Usually, the heat exchange path (110) of the auxiliary flow path system (100) is introduced from the upper end of the heat storage tank (60), and is discharged at the lower end after the heat exchange is completed. Therefore, the refrigerant is moved in the direction of gravity, and the heat exchange path (110) can be bent and arranged for heat exchange with the heat storage tank (60). However, in order to prevent the pressure loss from increasing, the heat exchange path (110) does not have a large number of bending. The heat exchange path (110) may have several gradual bendings. The heat storage medium in the heat storage tank (60) can circulate by convection, and thus energy (heat) can be efficiently stored.

The auxiliary flow path system (100) comes out from the heat storage tank (60) and is connected to the gas-liquid separation unit (90). The gas-liquid separation unit (90) is configured to separate the vaporized refrigerant and the liquefied refrigerant. The gas-liquid separation unit (90) may be formed of a cylinder-shaped gas-liquid separation header.

The gas-liquid separation unit (90) includes a condensation return path (120) for returning the vaporized refrigerant to the main flow path to return it to the condenser (20) and an expansion return path (130) for returning the liquefied refrigerant to the expansion valve. The expansion return path (130) may comprise a check valve (V30) and can be controlled to return only the liquefied refrigerant.

Configuration of the Evaporation-Side Composite Heat Exchanger

The evaporation-side composite heat exchanger (400) comprises a quenching chamber evaporator (451) configured to provide rapid cooling (quenching) to the quenching chamber, a freezing chamber evaporator (452) configured to provide freezing to the freezing chamber, a cooling chamber evaporator (453) configured to provide cooling to the cooling chamber, a freezing chamber-side evaporation pressure regulating portion (462) disposed between the freezing chamber evaporator and the expansion valve, a cooling chamber-side evaporation pressure regulating portion (463) disposed between the cooling chamber evaporator and the expansion valve, and a quenching chamber-side evaporation pressure regulating portion (461) disposed between the quenching chamber evaporator and the expansion valve.

Further, the evaporation-side composite heat exchanger (400) includes an evaporative-side inflow piping system (470) configured to supply the refrigerant to the evaporators and an evaporative-side outflow piping system (480) through which the refrigerant discharged from the evaporators pass. The evaporative-side inflow piping system (470) and the evaporative-side outflow piping system (480) are not independent from each other. The evaporative-side inflow piping system (470) and the evaporative-side outflow piping system (480) are connected in a special section and are designed to be able to supply refrigerant in a special situation to the evaporator at the same time.

The quenching chamber-side evaporation pressure regulator (461) comprises a first quenching chamber inflow pressure regulator and a second quenching chamber inflow pressure regulator. The first quenching chamber inflow pressure regulator and the second quenching chamber inflow pressure regulator are connected to the evaporation-side inflow piping system (470) and formed at the inlet of the quenching chamber evaporator (451).

Further, the quenching room-side evaporation pressure regulator (461) comprises a first quenching room temperature sensor (E11) and a second quenching room temperature sensor (E12). The first quenching room temperature sensor (E11) and the second quenching room temperature sensor (E12) are located at the outlet of the quenching room evaporator (451) and measure temperature of the outlet of the quenching room evaporator (451).

The freezing chamber-side evaporation pressure regulator (462) includes a freezing chamber inflow pressure regulator connected to the evaporation-side inflow piping system (470) and formed at the inlet of the freezing chamber evaporator (452).

Further, the freezing chamber-side evaporation pressure regulator (462) comprises a freezing chamber-side refrigerant re-inflow path (414) and a freezing chamber temperature sensor (E21). The freezing chamber-side refrigerant re-inflow path (414) is connected to a evaporation-side outflow piping system (480) and delivers the refrigerant discharged from the quenching room evaporator (451) to the freezing chamber-side evaporator (452). The freezing chamber temperature sensor (E21) is located on the outlet of the freezing chamber evaporator (452) and measures the outlet temperature of the freezing chamber evaporator (452).

The cooling chamber-side evaporation pressure regulator (463) includes a cooling chamber inflow pressure regulator connected to the evaporation-side inflow piping system (470) and formed at the inlet of the cooling chamber evaporator (453).

Further, the cooling chamber-side evaporation pressure regulator (463) comprises a cooling chamber-side refrigerant re-inflow path (417) and a cooling chamber temperature sensor (E31). The cooling chamber-side refrigerant re-inflow path (417) is connected to the evaporation-side outflow piping system (480) and brings the refrigerant discharged from the freezing chamber evaporator (452) into the cooling chamber evaporator (453). The cooling chamber temperature sensor (E31) is located on the outlet of the cooling chamber evaporator (453) and measures the outlet temperature of the cooling chamber evaporator (453).

Operation of the Evaporation-Side Quenching Chamber

The quenching chamber evaporator (451) uses only refrigerant flowing from the evaporation-side inflow piping system (470). The quenching chamber-side evaporation pressure regulator (461) comprises a first quenching chamber inflow pressure regulator and a second quenching chamber inflow pressure regulator. The first quenching chamber inflow pressure regulator and the second quenching chamber inflow pressure regulator are connected to the evaporation-side inflow piping system (470) and formed at the inlet of the quenching chamber evaporator (451).

The first quenching chamber inflow pressure regulator includes a first control valve (V401) and a first globe valve (V421) that are introduced from the evaporation-side inflow piping system (470). The second quenching chamber inflow pressure regulator includes a second control valve (V402) and a second globe valve (V422) that are introduced from the evaporation-side inflow piping system (470). The refrigerant controlled by the first quenching chamber inflow pressure regulator and the refrigerant controlled by the second quenching chamber inflow pressure regulator are merged by the quenching chamber refrigerant inflow path (411) and flow into the quenching chamber evaporator.

The first globe valve (V421) and the second globe valve (V422) are respectively connected to the first quenching chamber temperature sensor (E11) and the second quenching chamber temperature sensor (E12) to control the flow rate of the refrigerant. The first globe valve (V421) and the second globe valve (V422) are installed on the quenching room refrigerant outflow path (412) of the quenching chamber evaporator (451).

Two inflow pressure regulators are used in the quenching chamber evaporator (451) to control the inflow rate of the refrigerant according to the two temperature sensors. The first quenching chamber temperature sensor (E11) may be used at a reference temperature of −25 degrees and the second quenching chamber temperature sensor (E12) may be used at a reference temperature of −40 degrees.

The quenching chamber refrigerator (451) removes the inflow amount of the refrigerant so that the internal temperature can be maintained approximately between −40 and −25 degrees. The reference temperature of the quenching chamber temperature sensors can be changed variously according to the temperature control range of the quenching chamber.

Operation of the Evaporation-Side Freezing Chamber

The freezing chamber evaporator (452) may use only the refrigerant introduced from the evaporation-side inflow piping system (470), or may use the refrigerant introduced from the evaporation-side inflow piping system (470) and the refrigerant discharged from the quenching chamber evaporator (451) simultaneously.

The freezing chamber-side evaporation pressure regulator (462) includes a freezing chamber inflow pressure regulator and a freezing chamber-side refrigerant re-inflow path (414).

The freezing chamber inflow pressure regulator comprises a third control valve (V403), a fourth control valve (V404), and a third globe valve (V431) which are connected to the evaporation-side inflow piping system (470) and formed at the inlet of the freezing chamber evaporator (452).

The freezing chamber-side refrigerant re-inflow path (414) is connected to the evaporation-side outflow piping system (480) and introduce the refrigerant discharged from the quenching room evaporator (451) into the freezing chamber-side evaporator (452). And the freezing chamber-side refrigerant re-inflow path (414) comprises a seventh control valve (V407).

The freezing chamber evaporator (452) may be operated in two modes. One is a case where the refrigerant supplied from the evaporation-side inflow piping system (470) is used and the other is a case where the refrigerant gas discharged from the evaporation-side inflow piping system (470) and the quenching chamber evaporator (451) are used at the same time.

When only the refrigerant supplied from the evaporation-side inflow piping system (470) is used, the third control valve (V403) is closed and the fourth control valve (V404) is opened. At this time, the seventh control valve (V407) is closed.

In the freezing chamber evaporator (452), the third globe valve (V431) is controlled according to the refrigerant temperature of the freezing chamber evaporator (452) detected by the freezing chamber temperature sensor (E21) to control the refrigerant flowing into the freezing chamber evaporator (452). The freezing chamber temperature sensor (E21) is installed on the freezing chamber refrigerant discharge path (415).

In this case, the refrigerant flows into the freezing chamber evaporator (452) only through the freezing chamber refrigerant inflow path (413).

When the temperature of the gas discharged from the quenching chamber evaporator (451) is lower than the temperature of the freezing chamber evaporator (452), the refrigerant gas discharged from the evaporation-side inflow piping system (470) and the quenching chamber evaporator (451) are used at the same time. At this time, the refrigerant gas discharged from the quenching chamber evaporator (451) can be reused.

In this case, the seventh control valve (V407) is opened, the third control valve (V403) is opened, and the fourth control valve (V404) is closed. The refrigerant gas discharged from the quenching chamber evaporator (451) is introduced into the freezing chamber evaporator (452) and mixed to be used in the freezing chamber evaporator (452).

In this case, the refrigerant is supplied from both the freezing chamber refrigerant inflow path (413) and the freezing chamber-side refrigerant re-inflow path (414), and both refrigerants are supplied in a mixed state at one point in the freezing chamber evaporator (452).

Operation of the Evaporation-Side Cooling Chamber Evaporator

The cooling chamber evaporator (453) is driven substantially similar to the freezing chamber evaporator (452). Instead of reusing the refrigerant gas discharged from the quenching chamber evaporator (451), refrigerant gas discharged from the quenching chamber evaporator (451) or the freezing chamber evaporator (452) is reused.

The cooling chamber evaporator (453) may use only the refrigerant introduced from the evaporation-side inflow piping system (470) or may use the refrigerant introduced from the evaporation-side inflow piping system (470) and the refrigerant discharged from the quenching chamber evaporator (451) or the freezing chamber evaporator (452) at the same time.

The cooling chamber evaporation pressure regulator (463) includes a cooling chamber inflow pressure regulator and a cooling chamber-side refrigerant re-inflow path (417).

The cooling chamber inflow pressure regulator comprises a fifth control valve (V405), a sixth control valve (V406) and a fourth globe valve (V441). The fifth control valve (V405), the sixth control valve (V406) and the fourth globe valve (V441) are connected to the evaporation-side inflow piping system (470) and formed at the inlet of the cooling chamber evaporator (453).

The cooling chamber-side refrigerant re-inflow path (417) is connected to the evaporation-side outflow piping system (480) and introduce refrigerant discharged from the quenching chamber evaporator (451) and/or the freezing chamber evaporator (452) into the cooling chamber-side evaporator (453). The cooling chamber-side refrigerant re-inflow path (417) may comprise a eighth control valve (V408), a ninth control valve (V409), a tenth control valve (V410), a eleventh control valve (V411), and a twelfth control valve (V412). In this case, it is needless to say that the construction of the eighth to twelfth control valves may be configured in various models as long as the refrigerant gas discharged from the quenching chamber evaporator (451) and the freezing chamber evaporator (452) can be controlled.

The cooling chamber evaporator (453) may also be operated in two modes. One is a case where only the refrigerant supplied from the evaporation-side inflow piping system (470) is used and the other is a case where the refrigerant gas supplied from the evaporation-side inflow piping system (470) and refrigerant gas discharged from the quenching chamber evaporator (451) and/or the freezing chamber evaporator (452) are simultaneously used.

When only the refrigerant supplied from the evaporation-side inflow piping system (470) is used, the fifth control valve (V405) is closed and the sixth control valve (V406) is opened. At this time, the ninth control valve (V409) and the tenth control valve (V410) are closed.

Further, in the cooling chamber evaporator (453), the fourth globe valve (V441) can be controlled according to the refrigerant temperature of the cooling chamber evaporator (453) sensed by the cooling chamber temperature sensor (E31) to control the refrigerant flowing into the cooling chamber evaporator (453)

When the temperature of the gas discharged from die freezing chamber evaporator (452) or the quenching chamber evaporator (451) is lower than the temperature of the cooling chamber evaporator (453), the refrigerant gas discharged from the evaporation-side inflow piping system (470) and the refrigerant gas discharged from the quenching chamber evaporator (451) or the freezing chamber evaporator (452) are simultaneously used. At this time, the refrigerant gas discharged from the quenching room evaporator (451) or the freezing room evaporator (452) can be reused.

In this case, the ninth control valve (V409) is opened, the fifth control valve (V405) is opened, and the sixth control valve (V406) is closed. And the tenth control valve (V410) may be opened. The refrigerant gas discharged from the quenching room evaporator (451) or the freezing room evaporator (452) is introduced into the freezing room evaporator (452) and mixed. The mixed refrigerant gas is used in the cooling room evaporator (453).

Therefore, the refrigerant gas discharged after being used in the evaporator of each stage can be reused to increase the refrigerating efficiency.

It will be apparent to those skilled in the art that the present invention described above is not limited to the above-described embodiments and the accompanying drawings. It will be apparent to those skilled in the art that various substitutions, modifications and variations can be made within the spirit or scope of the present invention.

What is claimed is:

1. A refrigeration system using waste heat recovery by refrigerator discharge gas, the system comprising:
   a compressor configured to compress a refrigerant;
   a condenser configured to condense the compressed refrigerant introduced from the compressor;
   a main flow passage configured to deliver the refrigerant compressed in the compressor to the condenser;
   a heat storage tank configured to partially store the heat of the refrigerant discharged from the compressor;
   an auxiliary flow passage configured to deliver the refrigerant compressed in the compressor to the heat storage tank;
   an expansion valve configured to expand the refrigerant condensed in the condenser; and
   an evaporation-side composite heat exchanger configured to evaporate the expanded refrigerant,
   wherein the evaporation side composite heat exchanger comprises
      an evaporation pipe through which the refrigerant expanded in the expansion valve passes;
      a defrost water supply pipe through which circulating water in the heat storage tank passes;

a quenching chamber evaporator configured to provide quenching to a quenching chamber;
a freezing chamber evaporator configured to provide freezing to a freezing chamber;
a cooling chamber evaporator configured to provide cooling to a cooling chamber;
a quenching chamber-side evaporation pressure regulating portion disposed between the quenching chamber evaporator and the expansion valve;
a freezing chamber-side evaporation pressure regulating portion disposed between the freezing chamber evaporator and the expansion valve;
a cooling chamber-side evaporation pressure regulating portion disposed between the cooling chamber evaporator and the expansion valve;
an evaporation-side inflow piping system configured to supply the refrigerant to the evaporators; and
an evaporation-side outflow piping system configured to deliver the refrigerant discharged from the evaporators.

2. The system of claim 1, wherein the auxiliary flow passage comprises
a heat exchange path passing through the interior of the heat storage tank;
a gas-liquid separation unit located at a distal end of the heat exchange path and separating a vaporized refrigerant and a liquefied refrigerant;
a condensation return path for returning the refrigerant vaporized in the gas-liquid separation unit to the main flow passage; and
an expansion return path for returning the refrigerant liquefied in the gas-liquid separation unit to the expansion valve.

3. The system of claim 2, wherein the gas-liquid separation unit is formed of a cylinder-shaped gas-liquid separation header, and
the expansion return path comprising a check valve and connected to a lower part of the gas-liquid separation header returns the liquefied refrigerant to the expansion valve by gravity.

4. The system of claim 2, wherein the heat exchange path of the auxiliary flow passage is bendable in the heat storage tank.

5. The system of claim 2, further comprising an auxiliary heater disposed in the heat storage tank and capable of being heated by an external power source.

6. The system of claim 2, further comprising
a main flow path control valve located between the compressor and the condenser and controlling the main flow path; and
an auxiliary flow path control valve located at an inlet of the heat exchange path of the auxiliary flow passage,
wherein the flow path of the refrigerant is controlled by the main flow path control valve and the auxiliary flow path control valve.

7. The system of claim 2, wherein the main flow path and the auxiliary flow passage are controlled by a three-way valve.

8. The system of claim 1, wherein the quenching chamber-side evaporation pressure regulating portion comprises
a first quenching chamber inflow pressure regulator and a second quenching chamber inflow pressure regulator which are connected to the evaporation-side inflow piping system and formed at an inlet of the quenching chamber evaporator; and
a first quenching chamber temperature sensor and a second quenching chamber temperature sensor which are located at an outlet of the quenching chamber evaporator and measure temperature of the outlet of the quenching chamber evaporator,
wherein the first quenching chamber inflow pressure regulator is controlled by the first quenching chamber temperature sensor and the second quenching chamber inflow pressure regulator is controlled by the second quenching chamber temperature sensor.

9. The system of claim 1, wherein the freezing chamber-side evaporation pressure regulating portion comprises
a freezing chamber inflow pressure regulator connected to the evaporation-side inflow piping system and formed at an inlet of the freezing chamber evaporator;
a freezing chamber-side refrigerant re-inflow path connected to the evaporation-side outflow piping system and delivering the refrigerant discharged from the quenching chamber evaporator to the freezing chamber-side evaporator; and
a freezing chamber temperature sensor located on an outlet of the freezing chamber evaporator and measuring the outlet temperature of the freezing chamber evaporator,
wherein the freezing chamber-side inflow pressure regulator is controlled by the freezing chamber temperature sensor, and
the refrigerant from the evaporation-side inflow piping system and the refrigerant discharged from the freezing chamber-side refrigerant re-inflow path are mixed and introduced into the freezing chamber evaporator.

10. The system of claim 1, wherein the cooling chamber-side evaporation pressure regulating portion comprises
a cooling chamber inflow pressure regulator connected to the evaporation-side inflow piping system and formed at an inlet of the cooling chamber evaporator;
a cooling chamber-side refrigerant re-inflow path connected to the evaporation-side outflow piping system and introducing the refrigerant discharged from the freezing chamber evaporator into the cooling chamber-side evaporator; and
a cooling chamber temperature sensor located on an outlet of the cooling chamber evaporator and measuring the outlet temperature of the cooling chamber evaporator,
wherein the cooling chamber-side inflow pressure regulator is controlled by the cooling chamber temperature sensor, and
the refrigerant from the evaporation-side inflow piping system and the refrigerant discharged from the cooling chamber-side refrigerant re-inflow path are mixed and introduced into the cooling chamber evaporator.

* * * * *